United States Patent [19]

Schroeder et al.

[11] Patent Number: 5,459,820

[45] Date of Patent: Oct. 17, 1995

[54] METHOD FOR GRAPHICAL DISPLAY OF THREE-DIMENSIONAL VECTOR FIELDS

[75] Inventors: William J. Schroeder; Christopher R. Volpe, both of Schenectady, N.Y.

[73] Assignee: General Electric Company, Schenectady, N.Y.

[21] Appl. No.: 943,617

[22] Filed: Sep. 10, 1992

[51] Int. Cl.⁶ ................................................. G06T 17/10
[52] U.S. Cl. ............................................ 395/120; 395/141
[58] Field of Search ........................... 395/119, 120, 395/129, 131, 141, 152, 140; 364/509, 510, 578

[56] References Cited

U.S. PATENT DOCUMENTS

| | | | |
|---|---|---|---|
| 4,785,399 | 11/1988 | Evans et al. | 395/119 |
| 5,132,671 | 7/1992 | Louis et al. | 340/706 |
| 5,150,457 | 9/1992 | Behm et al. | 395/120 |

OTHER PUBLICATIONS

Requicha, "Representations for Rigid Solids: Theory, Methods, and Systems," 1980, pp. 437–464.
Schroeder et al, "The Stream Polygon: A Technique for 3D Vector Field Visualization", 1991, pp. 126–132, 417.
Foley et al, "Computer Graphics Principles and Practice", 1990, pp. 1060–1063.

*Primary Examiner*—Mark K. Zimmerman
*Assistant Examiner*—Michael Smith
*Attorney, Agent, or Firm*—Lawrence P. Zale; Marvin Snyder

[57] ABSTRACT

A graphic technique, implemented on a graphics computer, for visualizing 3-D vector data uses a stream tube which is a tube-like structure having a cross section of an n-sided polygon. The stream tube follows the path of a streamline in the 3-D vector data. Data can be visualized by varying the shape and size of the polygon along the streamline to represent changes in normal and shear strain, rotation and velocity. Additional scalar functions are represented by coloring the sides of the stream tube.

9 Claims, 3 Drawing Sheets

METHOD FOR GRAPHICAL DISPLAY OF THREE-DIMENSIONAL VECTOR FIELDS

BACKGROUND OF THE INVENTION

A common data form in science and engineering is the three-dimensional vector field. This data may represent information such as velocity of fluid flow or displacement of points in a continuum. A challenge facing the engineer or scientist is to efficiently develop an understanding of the data. This understanding is usually developed through the aid of visual representations such as computer graphics. Vector fields implicitly contain a large amount of data not directly nor easily observable. One of the more important factors is object deformation including local effects due to normal and shear strain and rotation. In addition it is useful to understand paths of particles in the field as well as the speed that the particles take in the vector field.

The simplest means of representing vector data is to draw an oriented and scaled line in the direction of the vector. In two dimensions this technique works reasonably well, but in three dimensions the resulting visual image is impossible to decipher correctly.

A technique referred to as streamlines uses paths that are everywhere tangent to the vector field, and are often thought of as representing the path that a massless particle would take in the fluid. Another technique called domain deformation represents the vector field by distorting the local geometry according to the vector data. These techniques fail to provide an understanding of the local deformations that exist within the vector field.

SUMMARY OF THE INVENTION

According to the present invention, a method for visualizing a three-dimensional vector field includes generating, on a graphics workstation, stream polygons and deforming each one according to components of local strain and rotation along a streamline. The radius of the stream polygons are varied, along the streamline, proportionally with a scalar function. The stream polygons can be swept along a streamline to form a stream tube. As an additional means of displaying data, the sides of the stream tube can be colored with different colors to represent some other scalar functions along the streamline. Instead of sweeping the stream polygons to create a stream tube, the stream polygons may alternatively be placed at selected intervals along a streamline.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

Figure 1:
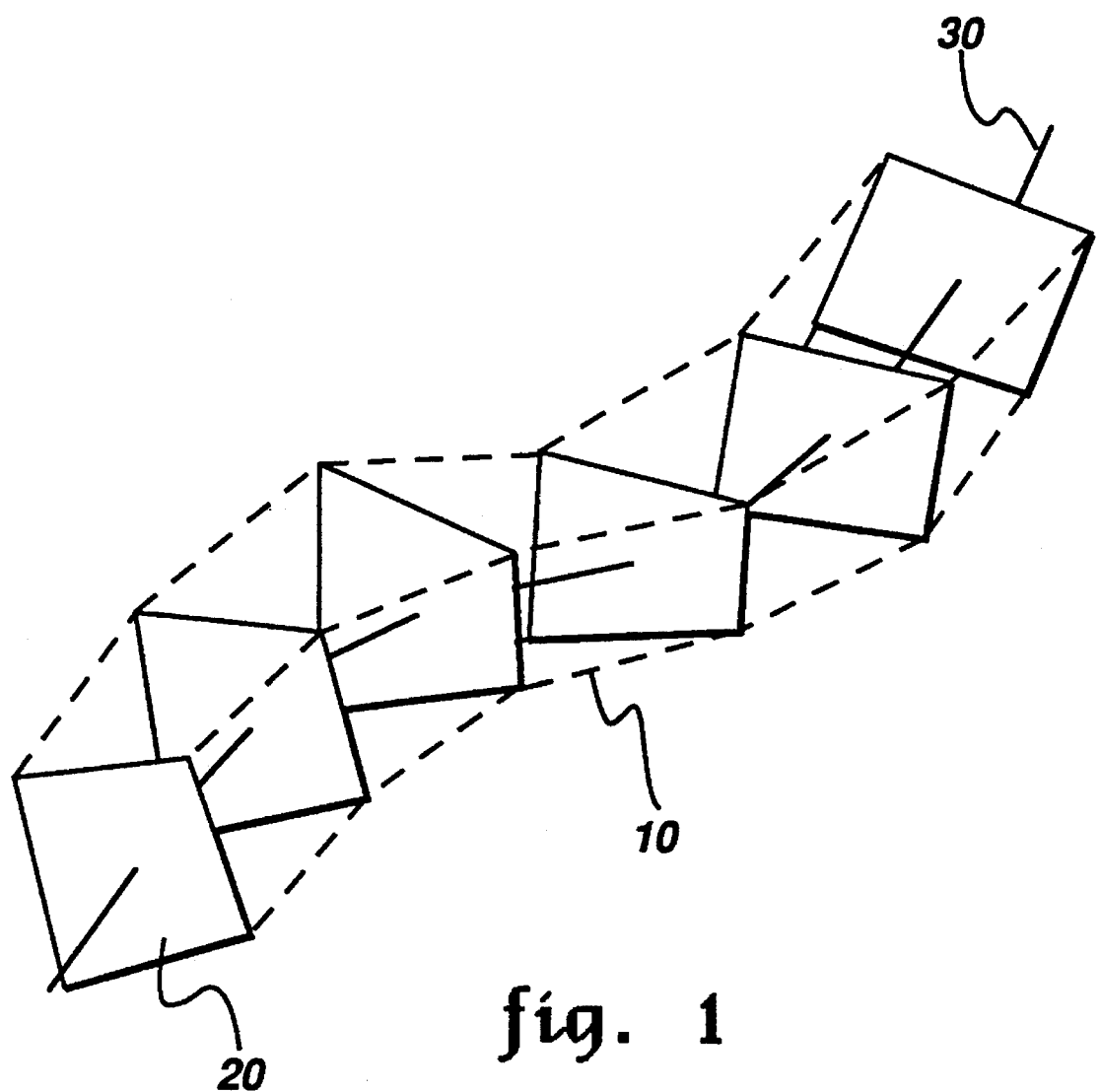
FIG. 1 shows a stream tube.

FIG. 1 shows a stream tube 10 which is a graphical device used to visualize certain aspects of a 3-dimensional vector field. The stream tube 10 is constructed mathematically by sweeping n-sided polygon 20 along a streamline 30. The streamline 30 is a path that a massless particle would take in the vector field (i.e., fluid flow) given a specified starting point for the particle. The stream polygons 20 can be rotated and deformed as they are swept to represent local strain and rotation along the streamline. The radius of the tube 10 can be varied as well, to represent changes in velocity magnitude. Each side of the tube 10 can be colored with a different (or same) color to represent additional variables simultaneously. It can be seen that by using this visualization technique, much information can be shown in a straightforward and highly compact manner.

Stream tube 10 can be constructed graphically using stream ribbons offset by a specified radius and angle from streamline 30. The dotted lines in FIG. 1 are the edges of two of the stream ribbons used in the case where the stream polygon is a quadrilateral. The ribbons when joined together, form tube 10 having the cross section of polygons 20. The offset radius of the ribbon varies with the magnitude of the vector. The rotation of stream tube 10 is achieved by rotating each of the ribbons composing tube 10. The rotation is determined by computing the local rotation of the vector field along streamline 30, or the so-called streamwise vorticity. be represented in a simple, intuitive manner.

Figure 2:
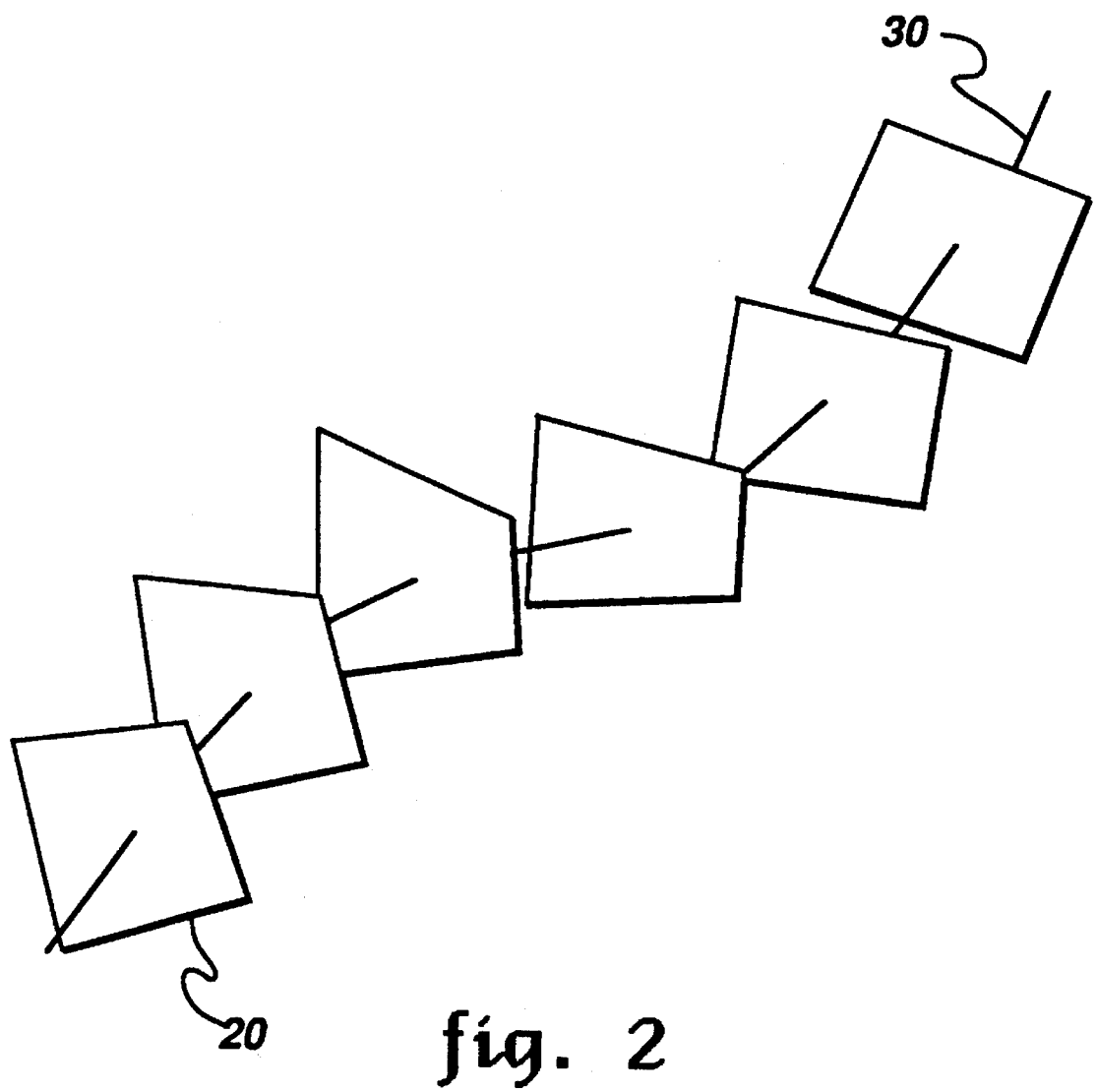
FIG. 2 shows stream polygons placed along a streamline.

An alternative to generating a stream tube 10 is to place multiple instances of stream polygons along streamline 30, as shown in FIG. 2. The stream polygons 20 may represent a single component of deformation or possibly combinations of deformation mode. By allowing the user to position the stream polygons interactively, it is possible to rapidly move visually along the streamline, viewing the local strain at any point.

It is necessary to characterize the vector field including local deformation, as well as techniques for computing the local vector and derivatives at any point in the vector field.

Consider a vector field v consisting of the m local vectors v=(u, v, w). To examine the local deformation due to V at the point x=(x, y, z), a first order Taylor's series expansion of v about x is constructed. Then the local deformation $e_{ij}$ is given by $$e_{ij} = \epsilon_{ij} + \omega_{ij}. \qquad (1)$$

where $\epsilon_{ij}$ is the local strain tensor, and $\omega_{ij}$ is the local rotational tensor.

It can be assumed that v represents a displacement field. For general vector fields, v may represent many possible data, hence the terms deformation, strain, and rigid body motion must be interpreted accordingly. For example, if V represents fluid flow, then these terms become deformation rate, strain rate, and velocity, respectively.

The local strain is given by $$\epsilon_{ij} = \begin{bmatrix} \frac{\partial u}{\partial x} & \frac{1}{2}\left(\frac{\partial u}{\partial y} + \frac{\partial v}{\partial x}\right) & \frac{1}{2}\left(\frac{\partial u}{\partial z} + \frac{\partial w}{\partial x}\right) \\ \frac{1}{2}\left(\frac{\partial u}{\partial y} + \frac{\partial v}{\partial x}\right) & \frac{\partial v}{\partial y} & \frac{1}{2}\left(\frac{\partial v}{\partial y} + \frac{\partial w}{\partial y}\right) \\ \frac{1}{2}\left(\frac{\partial u}{\partial z} + \frac{\partial w}{\partial x}\right) & \frac{1}{2}\left(\frac{\partial v}{\partial z} + \frac{\partial w}{\partial y}\right) & \frac{\partial w}{\partial z} \end{bmatrix} \quad (2)$$

Figure 3A:
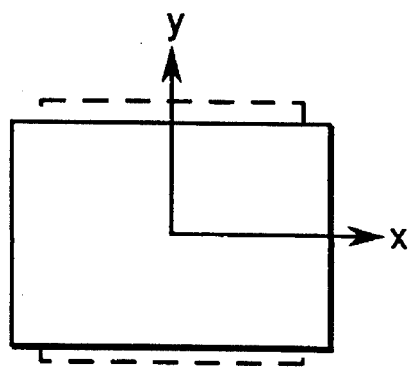
FIGS. 3a, 3b, 3c and 3d show stream polygons deformed according to the present invention.
Figure 3B:
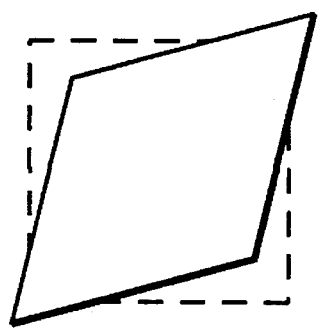

The terms along the diagonal of $\epsilon_{ij}$ are the normal components of strain. Examining a plane oriented in the x-y plane, normal strain causes uniform deformation along the x-y axes as shown in FIG. 3a. The terms off the diagonal are the shear components of strain. Shear strain causes angular deformation as illustrated by FIG. 3b.

The local rigid body rotation is given by $$\omega_{ij} = \begin{bmatrix} 0 & \frac{1}{2}\left(\frac{\partial u}{\partial y} - \frac{\partial v}{\partial x}\right) & \frac{1}{2}\left(\frac{\partial u}{\partial z} - \frac{\partial w}{\partial x}\right) \\ \frac{1}{2}\left(\frac{\partial v}{\partial x} - \frac{\partial u}{\partial y}\right) & 0 & \frac{1}{2}\left(\frac{\partial v}{\partial z} - \frac{\partial w}{\partial y}\right) \\ \frac{1}{2}\left(\frac{\partial w}{\partial x} - \frac{\partial u}{\partial z}\right) & \frac{1}{2}\left(\frac{\partial w}{\partial y} - \frac{\partial v}{\partial z}\right) & 0 \end{bmatrix} \quad (3)$$

Figure 3C:
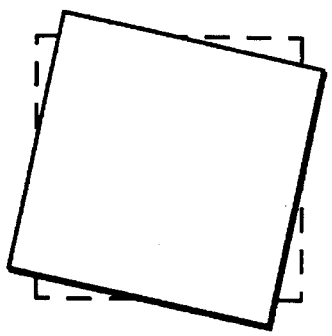
Figure 3D:
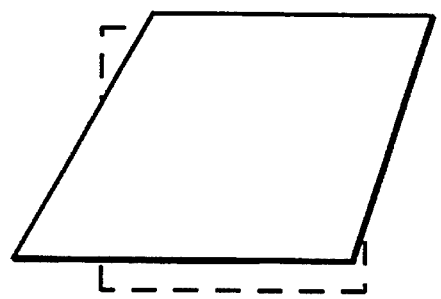

The rotation tensor describes the local rigid body rotation as shown in FIG. 3c. By adding the contributions of the normal and shear strain and the rotation, as shown in FIGS. 3a–3c, the total deformation can be also represented as illustrated in FIG. 3d.

Note that the local rotation tensor can also be written $$\omega_{ij} = -\frac{1}{2} \epsilon_{ijk}\omega \quad (4)$$

where $\epsilon_{ijk}$ is the alternating tensor, and $\omega$ is the rotation vector $$\omega = \begin{bmatrix} -\frac{\partial v}{\partial z} + \frac{\partial w}{\partial y} \\ \frac{\partial u}{\partial z} - \frac{\partial w}{\partial x} \\ -\frac{\partial u}{\partial y} + \frac{\partial v}{\partial x} \end{bmatrix} \quad (5)$$

In fluid flow where v is the velocity field, $\omega$ is the vorticity and represents the rate of angular velocity of the flow at a point. Another important flow parameter is stream vorticity, $\Omega$, or rotation about the local vector v given by the normalized dot product.

$$\Omega = \frac{v\omega}{|v||\omega|} \quad (6)$$

In most applications the vector field v is known only at m discrete points, and an interpolation function is required to compute the derivatives at the arbitrary point x in v. The geometry can be represented as a union of many non-overlapping elements, or cells, that are simple shapes such as hexahedron or tetrahedron. It is only at the vertices, or nodes, of the cells that v is known. Although many choices of interpolation function are possible, the iso-parametric formulation common to finite element analysis provides many advantages including simplicity of formulation, an abundance of prior work, common use in the analysis process, and the same formulation used regardless of element topology.

The geometry of each element is described by $$x = \sum_{i=1}^{p} N_i x_i \quad (7)$$

where $x_i$ are the node points of the element, and $N_i$ are the shape functions, one per element node. The shape functions vary depending upon element topology; for a hexahedron the shape functions are given in terms of the element coordinates $\epsilon = (\epsilon, \eta, \zeta)$ $$N_i = \frac{1}{8}(1-\epsilon_i)(1-\eta_i)(1-\zeta_i) \quad (8)$$

where $\epsilon_i, \eta_i, \zeta_i = \pm 1$ at the element nodes, and $\zeta < 1$ inside the element. Note that at a particular element node j we choose $\epsilon_j, \eta_j, \zeta_j$ such that $N_i = 1$ when $i = j$, $N_i = 0$ otherwise.

In an isoparametric formulation, the interpolation functions $N_i$ are the same for the element geometry as well as the nodal variable, in this case the vectors $v_i$. Hence the vector field in the element is given as $$v = \sum_{i=1}^{p} N_i v_i \quad (9)$$

The local derivatives can be computed from Equations (7), (8) and (9) as $$\delta v/\delta x = J^{-1} \delta v/\delta \epsilon \quad (10)$$

with J the Jacobian matrix $$J = \begin{bmatrix} \frac{\partial x}{\partial \epsilon} & \frac{\partial y}{\partial \epsilon} & \frac{\partial z}{\partial \epsilon} \\ \frac{\partial x}{\partial \eta} & \frac{\partial y}{\partial \eta} & \frac{\partial z}{\partial \eta} \\ \frac{\partial x}{\partial \zeta} & \frac{\partial y}{\partial \zeta} & \frac{\partial z}{\partial \zeta} \end{bmatrix} \quad (11)$$

and $$\partial x/\partial \epsilon = \sum_{i=1}^{p} (\partial N_i/\partial \epsilon) x_i \quad (12)$$

$$\partial v/\partial \epsilon = \sum_{i=1}^{p} (\partial N_i/\partial \epsilon) v_i \quad (13)$$

Computing the streamline is straightforward. The basic approach is to integrate the equation $$x(t) = \int_{t_0}^{t} v(s) ds. \quad (14)$$

In fluid flow, v(t) is the velocity and t is time, and the path generated can be considered the motion of a massless particle in the velocity field.

Generally the integration is performed numerically using interpolation functions such as those described previously and a numerical integration scheme such as the Euler or Runge-Kutta methods. As the integration proceeds, it is necessary to track the streamline as it moves through the cells, requiring repeated transformation from global to local coordinates. This transformation is performed by solving Equation (7) explicitly for $\epsilon(x)$ or using a numerical technique such as Newton's method.

Figure 4A:
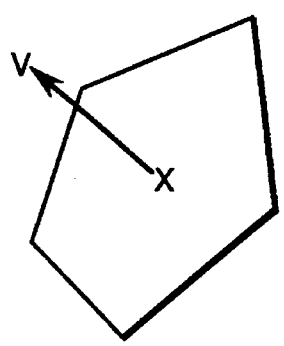
FIGS. 4a and 4b show a stream polygon.
Figure 4B:
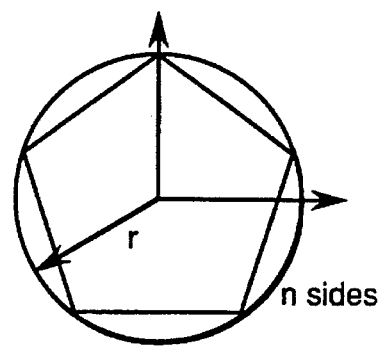

Consider a regular n-sided polygon whose center is located at position x and normal to the local vector v in vector field v. This polygon is called a stream polygon (sp) as shown in FIG. 4a. The radius of sp is defined as the radius r of the circumscribing circle of the polygon. The parameters r and the number of sides n (FIG. 4b) are constrained by $$0 \leq r \leq r_{max} \quad 0 \leq n \leq n_{max} \quad (15)$$

where $r_{max}$ and $n_{max}$ are arbitrarily chosen finite values and $n_{max}$ is an integer.

The stream polygon provides a number of simple, yet powerful techniques for creating graphical representations of 3D vector fields. The goal is to show the usual translational effects, as well as the effects of local strain and rotation and, in addition, scalar information.

The first technique is to deform sp according to the components of local strain and rotation. Equations 2 and 3 can be combined to yield the standard transformation matrix T containing effects due to scaling (normal strain), shear, and rotation. Then sp is deformed by transformation T.

It is also possible to project local strain onto the plane defined by the point x and the local vector v. For example, if the number of sides is n=4 (i.e., the polygon is a square), the local deformation can be represented exactly as shown in FIGS. 2a–2d. Here the contributions of the strain and rotation are immediately apparent, as well as the combination of all three. Another useful technique described by Equation 6 is to project the vorticity $\omega$ onto the local vector v. The resulting angle $\Omega$ is the rotation of sp above v.

Another effective use of the stream polygon is to vary the radius of the stream polygon according to some prescribed relationship with vector magnitude or other scalar function. For example, if v represents the velocity of an incompressible flow with no shear, then the equation $$r(v) = r_{max} \sqrt{\frac{|v_{min}|}{|v|}} \quad (16)$$

represents an area of constant mass flow. Here, $r_{max}$ is a user specified radius at the minimum flow velocity $v_{min}$.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A method for visualizing a three-dimensional vector field having an array of vectors v each having components (u,v,w) at different locations comprising the steps of:

(a) computing a streamline;

(b) generating a plurality of stream polygons having a central point (x,y,z) at selected locations along the streamline;

(c) computing local strain, rotation, and scalar magnitude relative to said central point from said vectors at the central point of each stream polygon;

(d) deforming said polygons according to components of the local strain and rotation computed for the central points along said streamline; and (e) varying radii of said stream polygons proportionally with the computed scalar magnitude.

2. The method for visualizing a three-dimensional vector field of claim 1 wherein an offset $\{\Delta x, \Delta y, \Delta z\}$ to a vertex location $\{I_x, I_y, I_z\}$ due to local strain, is:

$$\{\Delta x, \Delta y, \Delta z\} = \begin{bmatrix} \frac{\delta u}{\delta x} & \frac{1}{2}\left(\frac{\delta u}{\delta y}+\frac{\delta v}{\delta x}\right) & \frac{1}{2}\left(\frac{\delta u}{\delta z}+\frac{\delta w}{\delta x}\right) \\ \frac{1}{2}\left(\frac{\delta u}{\delta y}+\frac{\delta v}{\delta x}\right) & \frac{\delta v}{\delta y} & \frac{1}{2}\left(\frac{\delta v}{\delta y}+\frac{\delta w}{\delta y}\right) \\ \frac{1}{2}\left(\frac{\delta u}{\delta z}+\frac{\delta w}{\delta x}\right) & \frac{1}{2}\left(\frac{\delta v}{\delta z}+\frac{\delta w}{\delta y}\right) & \frac{\delta w}{\delta z} \end{bmatrix} \begin{bmatrix} l_x \\ l_y \\ l_z \end{bmatrix},$$

assuming the central point to be at the origin, and an offset $\{\Delta_x, \Delta_y, \Delta_z\}$ to a vertex location $\{I_x, I_y, I_z\}$ due to rotation is:

$$\{\Delta x, \Delta y, \Delta z\} = \begin{bmatrix} 0 & \frac{1}{2}\left(\frac{\delta u}{\delta y}-\frac{\delta v}{\delta x}\right) & \frac{1}{2}\left(\frac{\delta u}{\delta z}-\frac{\delta w}{\delta x}\right) \\ \frac{1}{2}\left(\frac{\delta v}{\delta x}-\frac{\delta u}{\delta y}\right) & 0 & \frac{1}{2}\left(\frac{\delta v}{\delta z}-\frac{\delta w}{\delta y}\right) \\ \frac{1}{2}\left(\frac{\delta w}{\delta x}-\frac{\delta u}{\delta z}\right) & \frac{1}{2}\left(\frac{\delta w}{\delta y}-\frac{\delta v}{\delta z}\right) & 0 \end{bmatrix} \begin{bmatrix} l_x \\ l_y \\ l_z \end{bmatrix},$$

also assuming the central point to be at the origin, and both offsets are calculated for each vertex location of the original stream polygon, and then added to the vertex location to result in a vertex location of the deformed stream polygon.

3. A method for visualizing a three-dimensional vector field having an array of vectors v each having components (u,v,w) at different locations comprising the steps of:
 (a) computing a streamline;
 (b) generating a at least one stream polygon having a central point along the streamline;
 (c) computing local strain, rotation, and scalar magnitude from said vectors at central point of each stream polygon;
 (d) deforming each stream polygon according to components of the local strain and rotation computed for the central points along said streamline;
 (e) varying the radius of said stream polygon proportionally with the computed scalar magnitude; and
 (f) sweeping the deformed stream polygon along said streamline to form a stream tube.

4. The method of claim 2 comprising the additional step of coloring sides of said stream tube formed by a side of the polygon as it is swept, to represent a plurality of scalar functions.

5. The method for visualizing a three-dimensional vector field of claim 3 wherein an offset $\{\Delta_x, \Delta_y, \Delta_z\}$ to a vertex location $\{I_x, I_y, I_z\}$ due to local strain, is:

$$\{\Delta x, \Delta y, \Delta z\} = \begin{bmatrix} \frac{\delta u}{\delta x} & \frac{1}{2}\left(\frac{\delta u}{\delta y}+\frac{\delta v}{\delta x}\right) & \frac{1}{2}\left(\frac{\delta u}{\delta z}+\frac{\delta w}{\delta x}\right) \\ \frac{1}{2}\left(\frac{\delta u}{\delta y}+\frac{\delta v}{\delta x}\right) & \frac{\delta v}{\delta y} & \frac{1}{2}\left(\frac{\delta v}{\delta y}+\frac{\delta w}{\delta y}\right) \\ \frac{1}{2}\left(\frac{\delta u}{\delta z}+\frac{\delta w}{\delta x}\right) & \frac{1}{2}\left(\frac{\delta v}{\delta z}+\frac{\delta w}{\delta y}\right) & \frac{\delta w}{\delta z} \end{bmatrix} \begin{bmatrix} l_x \\ l_y \\ l_z \end{bmatrix},$$

assuming the central point to be at the origin, and an offset $\{\Delta x, \Delta y, \Delta z\}$ to a vertex location $\{I_x, I_y, I_z\}$ due to rotation is:

$$\{\Delta x, \Delta y, \Delta z\} = \begin{bmatrix} 0 & \frac{1}{2}\left(\frac{\delta u}{\delta y} - \frac{\delta v}{\delta x}\right) & \frac{1}{2}\left(\frac{\delta u}{\delta z} - \frac{\delta w}{\delta x}\right) \\ \frac{1}{2}\left(\frac{\delta v}{\delta x} - \frac{\delta u}{\delta y}\right) & 0 & \frac{1}{2}\left(\frac{\delta v}{\delta z} - \frac{\delta w}{\delta y}\right) \\ \frac{1}{2}\left(\frac{\delta w}{\delta x} - \frac{\delta u}{\delta z}\right) & \frac{1}{2}\left(\frac{\delta w}{\delta y} - \frac{\delta v}{\delta z}\right) & 0 \end{bmatrix} \begin{bmatrix} l_x \\ l_y \\ l_z \end{bmatrix},$$

also assuming the central point to be at the origin, and both offsets are calculated for each vertex location of the original stream polygon, and then added to the vertex location to result in a vertex location of the deformed stream polygon.

6. A method for visually depicting an array of three dimensional vectors v each having components (u,v,w) in a graphics computer comprising the steps of:

generating on said graphics computer, a streamline emanating from a user selected point in said vector; and generating a plurality of stream polygons having a central point along points of said streamline at preselected intervals, computing local strain, rotation, and scalar magnitude from said vector data at the central points; and deforming said stream polygons to represent the computed local strain, and rotation.

7. The method for visually depicting an array of three dimensional vectors of claim 6 wherein an offset $\{\Delta x, \Delta y, \Delta z\}$ to a vertex location $\{I_x, I_y, I_z\}$ due to local strain, is:

offsets are calculated for each vertex location of the original stream polygon, and then added to the vertex location to result in a vertex location of the deformed stream polygon.

8. A method for visually depicting an array of three dimensional vectors v each having components (u,v,w) in a graphics computer comprising the steps of:

generating on said graphics computer, a streamline emanating from a user selected point in said vector array;

generating at least one stream polygon having a central point along said streamline;

computing local strain, rotation, and scalar magnitude from said vector array at the central points along said streamline;

deforming each stream polygon to represent the computed local strain, and rotation; and sweeping said stream polygon along the streamline to form a stream tube.

9. The method for visually depicting an array of three dimensional vectors of claim 8 wherein an offset $\{\Delta x, \Delta y, \Delta z\}$ to a vertex location $\{I_x, I_y, I_z\}$ due to local strain, is:

$$\{\Delta x, \Delta y, \Delta z\} = \begin{bmatrix} \frac{\delta u}{\delta x} & \frac{1}{2}\left(\frac{\delta u}{\delta y} + \frac{\delta v}{\delta x}\right) & \frac{1}{2}\left(\frac{\delta u}{\delta z} + \frac{\delta w}{\delta x}\right) \\ \frac{1}{2}\left(\frac{\delta u}{\delta y} + \frac{\delta v}{\delta x}\right) & \frac{\delta v}{\delta y} & \frac{1}{2}\left(\frac{\delta v}{\delta y} + \frac{\delta w}{\delta y}\right) \\ \frac{1}{2}\left(\frac{\delta u}{\delta z} + \frac{\delta w}{\delta x}\right) & \frac{1}{2}\left(\frac{\delta v}{\delta z} + \frac{\delta w}{\delta y}\right) & \frac{\delta w}{\delta z} \end{bmatrix} \begin{bmatrix} l_x \\ l_y \\ l_z \end{bmatrix},$$

central point to be at the origin, and an offset $\{\Delta x, \Delta y, \Delta z\}$ to a vertex location $\{I_x, I_y, I_z\}$ due to rotation is:

$$\{\Delta x, \Delta y, \Delta z\} = \begin{bmatrix} 0 & \frac{1}{2}\left(\frac{\delta u}{\delta y} - \frac{\delta v}{\delta x}\right) & \frac{1}{2}\left(\frac{\delta u}{\delta z} - \frac{\delta w}{\delta x}\right) \\ \frac{1}{2}\left(\frac{\delta v}{\delta x} - \frac{\delta u}{\delta y}\right) & 0 & \frac{1}{2}\left(\frac{\delta v}{\delta z} - \frac{\delta w}{\delta y}\right) \\ \frac{1}{2}\left(\frac{\delta w}{\delta x} - \frac{\delta u}{\delta z}\right) & \frac{1}{2}\left(\frac{\delta w}{\delta y} - \frac{\delta v}{\delta z}\right) & 0 \end{bmatrix} \begin{bmatrix} l_x \\ l_y \\ l_z \end{bmatrix},$$

assuming the central point to be at the origin, and both $$\{\Delta x, \Delta y, \Delta z\} = \begin{bmatrix} \frac{\delta u}{\delta x} & \frac{1}{2}\left(\frac{\delta u}{\delta y} + \frac{\delta v}{\delta x}\right) & \frac{1}{2}\left(\frac{\delta u}{\delta z} + \frac{\delta w}{\delta x}\right) \\ \frac{1}{2}\left(\frac{\delta u}{\delta y} + \frac{\delta v}{\delta x}\right) & \frac{\delta v}{\delta y} & \frac{1}{2}\left(\frac{\delta v}{\delta y} + \frac{\delta w}{\delta y}\right) \\ \frac{1}{2}\left(\frac{\delta u}{\delta z} + \frac{\delta w}{\delta x}\right) & \frac{1}{2}\left(\frac{\delta v}{\delta z} + \frac{\delta w}{\delta y}\right) & \frac{\delta w}{\delta z} \end{bmatrix} \begin{bmatrix} l_x \\ l_y \\ l_z \end{bmatrix},$$

assuming the central point to be at the origin, and an offset $\{\Delta x, \Delta y, \Delta z\}$ to a vertex location $\{I_x, I_y, I_z\}$ due to rotation is:

$$\{\Delta x, \Delta y, \Delta z\} = \begin{bmatrix} 0 & \frac{1}{2}\left(\frac{\delta u}{\delta y} - \frac{\delta v}{\delta x}\right) & \frac{1}{2}\left(\frac{\delta u}{\delta z} - \frac{\delta w}{\delta x}\right) \\ \frac{1}{2}\left(\frac{\delta v}{\delta x} - \frac{\delta u}{\delta y}\right) & 0 & \frac{1}{2}\left(\frac{\delta v}{\delta z} - \frac{\delta w}{\delta y}\right) \\ \frac{1}{2}\left(\frac{\delta w}{\delta x} - \frac{\delta u}{\delta z}\right) & \frac{1}{2}\left(\frac{\delta w}{\delta y} - \frac{\delta v}{\delta z}\right) & 0 \end{bmatrix} \begin{bmatrix} l_x \\ l_y \\ l_z \end{bmatrix},$$

assuming the central point to be at the origin, and both offsets are calculated for each vertex location of the original stream polygon, and then added to the vertex location to result in a vertex location of the deformed stream polygon.

* * * * *